(No Model.)
H. S. HALE.
SEAT FOR RAILWAY CARS.
No. 509,527. Patented Nov. 28, 1893.
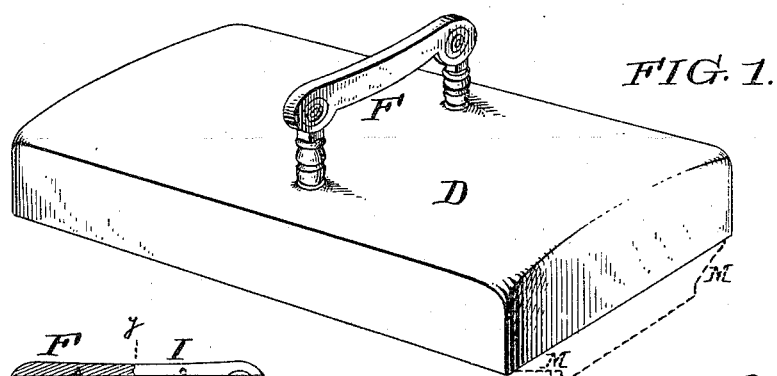
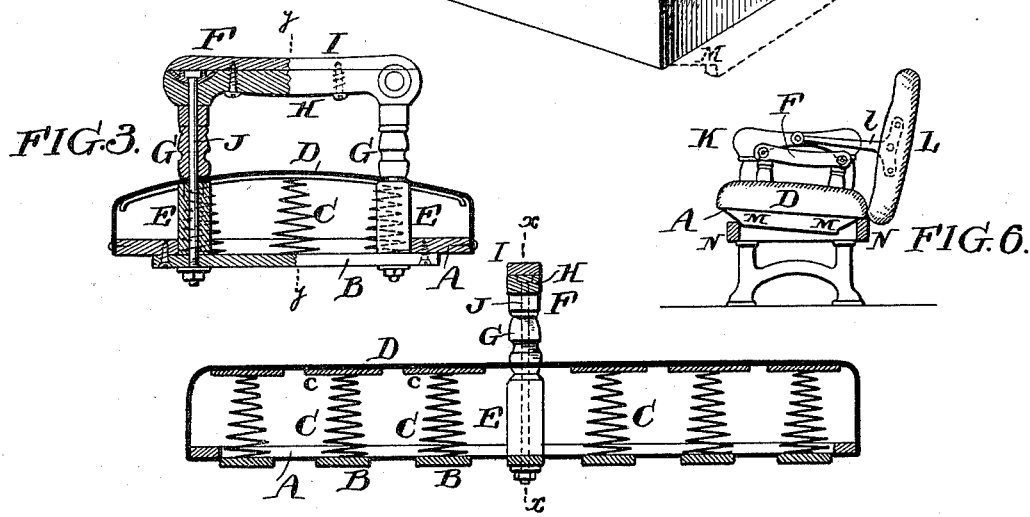
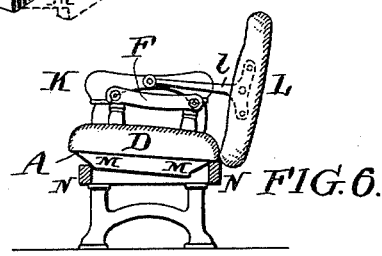
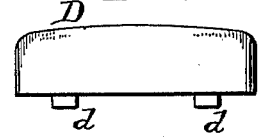
Witnesses:
Inventor
Henry S. Hale
By his atty

UNITED STATES PATENT OFFICE.

HENRY S. HALE, OF PHILADELPHIA, PENNSYLVANIA.

SEAT FOR RAILWAY-CARS.

SPECIFICATION forming part of Letters Patent No. 509,527, dated November 28, 1893.

Application filed January 26, 1893. Serial No. 459,771. (No model.)

*To all whom it may concern:*

Be it known that I, HENRY S. HALE, of the city and county of Philadelphia and State of Pennsylvania, have invented an Improvement in Seats for Railway-Cars, &c., of which the following is a specification.

My invention has reference to railway car seats, and consists of certain improvements which are fully set forth in the following specification and shown in the accompanying drawings which form a part thereof.

This improvement is adapted to any of the usual types of reversible car seats.

It essentially consists in providing the seat cushion of a car seat with a frame supporting the cushion structure and also an intermediate arm rest which extends from below the cushion to some distance above the same and is movable with the cushion and frame as a whole. My invention also comprehends the combination of a cushion seat of this character with a car seat structure having a movable or reversible back whereby the cushion and its arm rest shall shift simultaneously and in accordance with the reversing action of the seat.

My invention also includes certain specific details of construction fully set out hereinafter.

In the drawings: Figure 1 is a perspective view of a car seat cushion embodying my invention. Fig. 2 is a longitudinal section of same on line $y-y$ of Fig. 3. Fig. 3 is a cross section of same on line $x-x$ of Fig. 2. Fig. 4 is a perspective view of a modification of my invention. Fig. 5 is an end elevation of one of the cushions removed from the seat shown in Fig. 4; and Fig. 6 is a cross section of a reversible car seat showing my improvement applied thereto.

A is the main frame of the cushion or seat and in the cases of Figs. 1, 2 and 3 is provided with a series of cross bars B. This frame, however, may be made in any suitable manner. The cushion springs C are supported upon the cross bars B of the frame A and may be provided at their tops with the transverse spring plates $c$ upon which the upholstery covering D rests, which latter forms the cushion proper. This part of the seat may be adapted to suit the desires of the trade. Any other method of upholstering the seat may be employed. Each end of the seat is devoid of arms but at the middle or an intermediate point I provide a low arm rest F which is firmly secured to the frame A at a point below the cushion D, and extended upward to a short distance above the cushion. The construction of arm rest I prefer is clearly shown. Two uprights E are secured to the frame A and have their tops on a level with the upholstery covering D. Short sections G are arranged upon the ends of the parts E and carry at their tops the main transverse bar H of the arm rest F. Bolts J are passed through the parts G, G, E and B and adapted to hold them firmly together. The cap I may then be placed upon the arm rest and secured by screws as shown to impart a finish. It will be observed that by this construction the arm rest appears to come up through the upholstery D of the seat whereas in reality it is only necessary to have the bolts J extend through the upholstery D, the edges adjacent to the bolts being clamped or otherwise secured between the parts E and G as shown in Fig. 3.

It is evident that in place of making the arm rest of separate pieces and holding them together by bolts, they may be made of one rigid structure secured to the frame A in any suitable manner and the upholstery properly fastened about the upright portions of the said arm rest. It is also evident that if desired the frame A may have the upholstered portions secured to it substantially as indicated in Figs. 4 and 5, that is to say, there may be two upholstered cushion parts D detachable with respect to the frame A and its intermediate arm rest F. In this case the cushion D forming the upholstered parts would have projections $d$ of some suitable kind which will fit down into the structure of the frame A to hold them in position upon it. With this modification of my improvement the entire structure would move as a unit and be adapted to the reversible car seat as in the case of the structures shown in Figs. 1, 2 and 3.

In Fig. 4 the upholstered parts D are shown as not quite meeting at the middle, but it is evident that their adjacent edges may be recessed somewhat so that they may meet to form substantially a continuous upholstered part as indicated in Fig. 1.

In Fig. 6 is shown one type of a reversible seat back. K are the main arms similar to any railroad car seat. L is the reversible seat back and is hinged to the arms K or the main frame of the said car seat by striker arms *l* of any suitable construction. N, N are transverse bars of the main frame of the car seat and support the movable seat cushion illustrated in the various figures of the drawings. The cushion is supported upon a frame work having the cams M which work in connection with the transverse bars N or suitable parts in the main frame to cause the seat to be tilted when shifted. It is quite evident that the cam parts M may be formed upon the frame of the cushion as indicated in dotted lines in Figs. 1 and 4.

I do not confine myself to any type of reversible car seat as my improved seat cushion is adapted to any of the numerous types which are now upon the market.

It will be observed that by my improvement each person will be enabled to secure one half of the car seat and the objections to one person crowding another in seats of this character will be obviated. By making the arm rest movable with the seat cushion it will always have the right position for comfort and will not interfere with the usual construction of the main frame in the car seat. It is quite evident that the frame A, B may be of any suitable construction, that shown being a convenient way of making it and one which imparts strength and rigidity combined with lightness. I do not limit myself to the main details of construction.

What I claim as new, and desire to secure by Letters Patent, is—

1. A car seat cushion independent of the stationary seat frame consisting of a frame having an intermediate arm rest carried by the frame and located between its ends, and upholstery carried by the frame and located on each side of the intermediate arm rest, the whole forming a single unitary structure.

2. A seat cushion for a railway car seat which consists of a frame supporting upholstery to form the cushion proper provided with an intermediate arm rest carried by the frame and extending a short distance above the upholstery of the cushion proper and arranged intermediate of its ends, the said arm rest consisting of a frame within the cushion and a frame above the cushion and clamping bolts uniting the two frames.

3. In a cushion for a car seat, the combination of a frame, a cushion structure consisting of springs and upholstery carried by said frame, an arm rest arranged intermediate of the ends of the seat and resting upon the upholstery and clamping bolts extending through the arm rest into a portion of the frame below the surface of the seat cushion for the purpose of securely holding the arm rest in position upon the cushion.

4. In a cushion for a car seat, the combination of a frame having uprights at or near its middle, of a height corresponding to the height of the upholstery of the cushion, an arm rest adapted to rest upon the said uprights, springs carried by the frame and upholstery resting upon the springs and arranged between the uprights and arm rest, and clamping bolts extending through the arm rest and uprights for securely holding them in position and clamping the upholstery in position.

5. A seat cushion consisting of an upholstered frame and an intermediate arm rest located above the upholstered face of the frame and between the ends of the frame, the intermediate arm rest being connected with a portion of the frame below the upholstered surface.

6. In a car seat the combination of the main stationary frame having arms, a reversible or shifting back, and a shifting seat independent of the stationary frame and supported by it consisting of a frame having an intermediate arm rest located between its ends and upholstery carried by the frame and located on each side of the intermediate arm rest, the whole forming a single unitary structure whereby the seat cushion is divided into two portions and the intermediate arm rest is shifted with the seat cushion.

7. A seat cushion for a railway car seat consisting of a frame supporting upholstery, an intermediate arm rest located between the ends of the frame and above the upholstered surface, bolts connecting the intermediate arm rest with the body of the stationary frame, and a cap carried by the arm rest to conceal the bolts.

In testimony of which invention I have hereunto set my hand.

HENRY S. HALE.

Witnesses:
ERNEST HOWARD HUNTER,
C. M. DIETTERICH.